United States Patent Office.

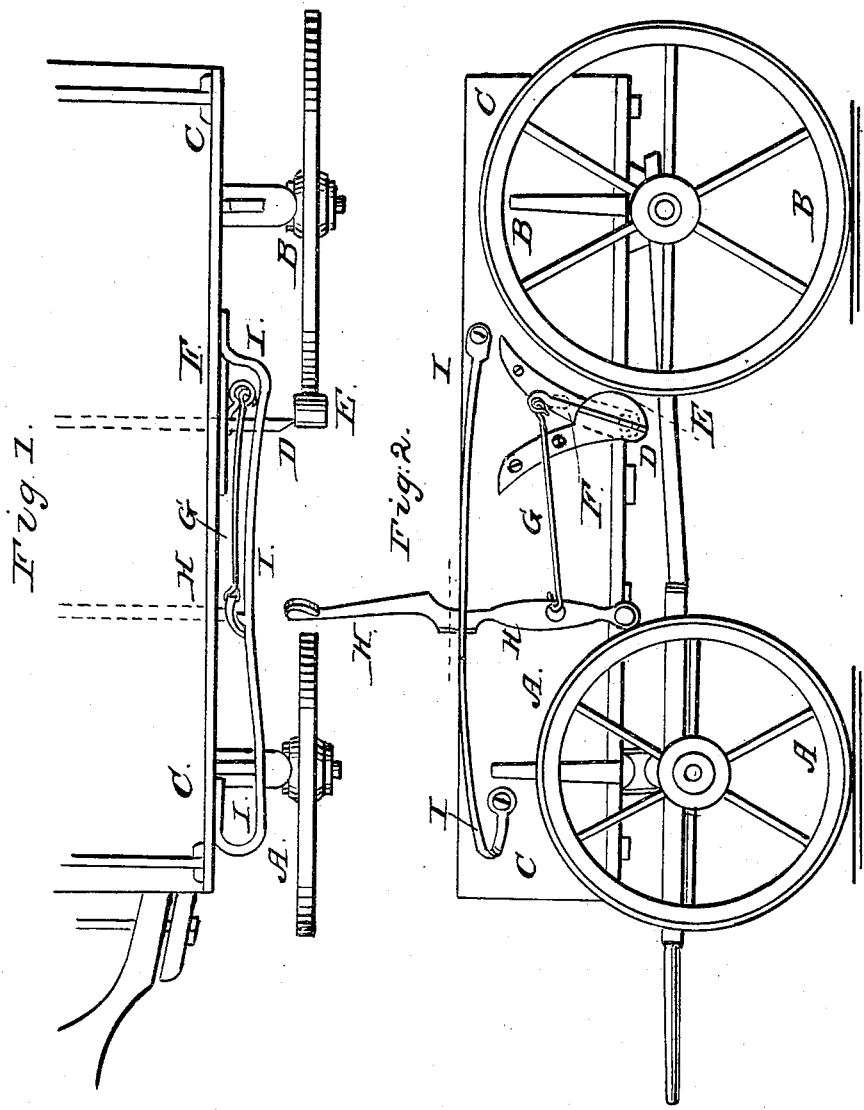

GEORGE B. DOUGLAS, OF SEDALIA, MISSOURI, ASSIGNOR TO HIMSELF AND J. H. SCHEER, OF THE SAME PLACE.

Letters Patent No. 89,639, dated May 4, 1869.

IMPROVEMENT IN BRAKES FOR WAGONS.

The Schedule referred to in these Letters Patent and making part of the same.

*To all whom it may concern:*

Be it known that I, GEORGE B. DOUGLAS, of Sedalia, in the county of Pettis, and State of Missouri, have invented a new and improved Brake and Horse-Holder; and I do hereby declare that the following is a full, clear, and exact description thereof, which will enable those skilled in the art to make and use the same, reference being had to the accompanying drawings, forming part of this specification, in which—

Figure 1 is a partial top view of a wagon, to which my improved brake has been attached, partly in section, through the line x x, fig. 2.

Figure 2 is a side view of the same.

Similar letters of reference indicate corresponding parts.

My invention has for its object to furnish an improved brake, which shall be so constructed and arranged as to be self-locking, and, at the same time, serve as a horse-holder for checking the horses, should they start when left alone; and It consists in the construction and combination of the various parts, as hereinafter more fully described.

A are the fore wheels;

B are the rear wheels; and

C is the box of the wagon, about the construction of which parts there is nothing new.

D is the brake-bar, which passes across the bottom of the wagon-box C, from side to side, and which works in supports attached to the sides of said box.

To the ends of the bar or shaft D are eccentrically attached the half-round brake-blocks E, so that, as the bar D is turned in one direction, the curved face of said eccentric-blocks E may come in contact with the wheels B and lock them.

To the bar D, near one side of the box C, is rigidly attached, or upon it is formed, an arm, F, to the upper end of which is pivoted the end of the connecting-rod G, the other end of which is pivoted to the operating-lever H.

The lower end of the lever H is pivoted to an arm or support attached to the bottom of the wagon-box C.

The upper end of the lever H extends up along the side of the box C, into such a position that it can be conveniently reached and operated by the driver.

I is a guard, the ends of which are attached to the side of the box C, and which extends longitudinally along the upper part of the side of the box C, to serve as a guide to, and to limit the movement of the lever H.

Upon the inner side of the guard I is formed a notch, or catch, *i*, in such a position that when the lever H catches upon said catch the eccentric brake-blocks E will be turned into such a position as to bear against the wheels D, so that, should the wagon be moved forward, the friction of the wheels B against the curved faces of the eccentric-blocks E will turn the said blocks E, so as to securely lock both wheels, while, at the same time, the upper end of the lever H is drawn back to the rear part of the guard I.

When the upper end of the lever H is moved forward to the forward part of the guard I, the eccentric-blocks E will be turned away from the wheels B, and will be held away by the weight of said lever.

When it is desired to leave the horses standing without being held, the lever H is placed in the catch *i* of the guard I, and the reins are secured to the upper end of said lever.

Then, should the horses start and draw the wagon forward, the movement of the wheels will operate upon the eccentric brake-blocks E, and securely lock the said wheels, and, at the same time, the rearward movement of the upper end of the lever H will draw the reins taut, checking the horses.

I claim as new, and desire to secure by Letters Patent—

The combination and arrangement of the eccentric brake-blocks E, bar, or shaft D, arm F, connecting-rod G, lever H, and guard I, having a catch, *i*, formed upon it, with each other, operating as herein shown and described, and for the purpose set forth.

GEORGE B. DOUGLAS.

Witnesses:
JEREMIAH J. CULBERTSON,
WILLIAM R. MURPHY.